(12) United States Patent
Cook et al.

(10) Patent No.: US 7,111,989 B1
(45) Date of Patent: Sep. 26, 2006

(54) BEARING ASSEMBLY AND LUBRICATING GREASE

(75) Inventors: John P. Cook, Naperville, IL (US); Xuehai (Ben) Ni, Canton, MI (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 281 days.

(21) Appl. No.: 10/262,452

(22) Filed: Oct. 1, 2002

(51) Int. Cl.
*F16C 33/66* (2006.01)

(52) U.S. Cl. ...................................... 384/462
(58) Field of Classification Search ................. 384/462, 384/477, 496, 495, 558
See application file for complete search history.

(56) References Cited

U.S. PATENT DOCUMENTS

| | | | |
|---|---|---|---|
| 3,939,083 A | * | 2/1976 | Coppock et al. ............. 508/212 |
| 5,910,470 A | | 6/1999 | Minami et al. |
| 6,020,290 A | | 2/2000 | Takata et al. |
| 6,474,870 B1 | | 11/2002 | Ni |

OTHER PUBLICATIONS

Rizvi et al., "Lubricant Additives and Their Functions," *ASM Handbook, Friction, Lubrication and Wear Technology*, 18:98–112 (1992).
Booser et al., "The push toward lifetime lubes," *Machine Design*, 77–84 (May 17, 2001).
Shell Alvania® Greases EP, Premium quality, multipurpose extreme pressure greases.
Exxon ARAPEN RB 320 Grease.
Chevron SRI Grease NLGI 2.
Shell Darina® Greases EP Multipurpose non–soap extreme pressure greases for lubrication of bearings operating at elevated temperatures.
Texaco Multifak® EP 0, 1, 2.
Mobilith AW Series lithium–complex greases.
Mobilith SHC Series greases.

* cited by examiner

*Primary Examiner*—Lenard A. Footland
(74) *Attorney, Agent, or Firm*—McDonnell Boehnen Hulbert & Berghoff LLP (57) ABSTRACT

A bearing assembly having an inner ring and an outer ring and a plurality of rolling elements positioned therebetween, and a lubricant disposed about the rolling elements between the inner ring and the outer ring where the lubricant comprises a hydrocracked base oil and a lithium complex thickener.

23 Claims, 8 Drawing Sheets

Graph 1. Four ball EP index for all the greases tested

FIG. 2B

Graph 2. Four ball weld load for all greases tested

FIG. 3

Graph 3. Low temperature torque test results

FIG. 4

Graph 4. Speed versus Temperature for 1 7/16 bore ball bearings

FIG. 5

Graph 5. Oxidation Stability in the Bomb Oxidation Test

FIG. 6

Graph 6. Oil separation results

FIG. 7

Graph 7. Base oil viscosity as reported in specification sheets

BEARING ASSEMBLY AND LUBRICATING GREASE

FIELD OF THE INVENTION

The present invention relates to bearing assemblies and lubricating grease. More specifically, it relates to bearing assemblies having a lubricating grease disposed about the bearing assembly components.

BACKGROUND

Various types of bearings, including rolling element bearings, are known in the art. A bearing is generally a device used to reduce friction between moving surfaces and to support moving loads. One common type of bearing is a rolling element bearing that typically includes an outer ring, inner ring, and rolling elements. The outer ring is larger in diameter than the inner ring such that a number of rolling elements, in the form of solid balls or rollers, are placed at intervals in the open space between the inner and outer rings.

Proper lubrication between these rolling elements and other relative moving parts is essential and often required in many different kinds of bearings to extend bearing life and prevent bearing failure. Generally, there are many types of lubricants. For instance, grease is one of the most well known lubricants. Grease is typically packed into a bearing so that it can fill the areas between the various moving parts, and in particular, the balls or rolling elements. Often, the useful life of a bearing depends on the proper lubrication of the bearing, and the type of lubrication that is used. This may be especially true in bearings where operating conditions may include caustic or corrosive substances, dirt, moisture, and high or low temperatures and pressures. In operation, the lubricant forms a thin film that separates the moving parts, such as separating the balls or rollers from the inner and outer ring to prevent direct metal-to-metal contact. The film is formed as a function of the speed of the rolling elements. The higher the speed of the roller element, the more heat is generated and the more the oil tends to thin or lose its viscosity. At high heat, the oil will no longer support the loads and metal surfaces will contact and wear rapidly. Previously, rolling element bearing greases were made with mineral oils, or Group I oils, as the base oil for the grease. However, the Group I mineral oils tended to thin at higher temperatures, resulting in metal to metal surface contact and rapid wear. Moreover, Group I mineral oils are limited in oxidation lifetime and lose viscosity swiftly as temperatures increase. Synthetic oils have been used as the base oil for a rolling element grease as well, to improve the effective temperature range of a rolling element bearing grease. However, synthetic oils are significantly more expensive to use.

Thus, there is a need to provide a rolling element bearing grease that provides for a greater effective temperature range than conventional Group I mineral oils, and that is less expensive than the synthetic oils.

SUMMARY

The present embodiments provide a rolling element bearing that includes a lubricant grease comprised of a hydrocracked base oil, or Group II oil, as well as a lithium complex thickener. The hydrocracked oils thin less with heat than mineral oils or Group I oils, and also resist oxidation better. Therefore, the rolling element bearing grease lasts longer in rolling element bearings and provides a higher temperature service than mineral or Group I oils. Thus, the hydrocracked oil-based grease provides for longer lubricant life that directly results in longer bearing life. The hydrocracked oil-based grease lasts longer and can run hotter without degradation than the prior art conventional mineral oil, and is significantly less costly than synthetic oils. In addition, testing has shown that the hydrocracked oil-based grease with a lithium complex thickener provides improved bearing performance in a number of standard ASTM tests for rolling element bears.

DETAILED DESCRIPTION OF EXEMPLARY EMBODIMENTS

Figure 1:
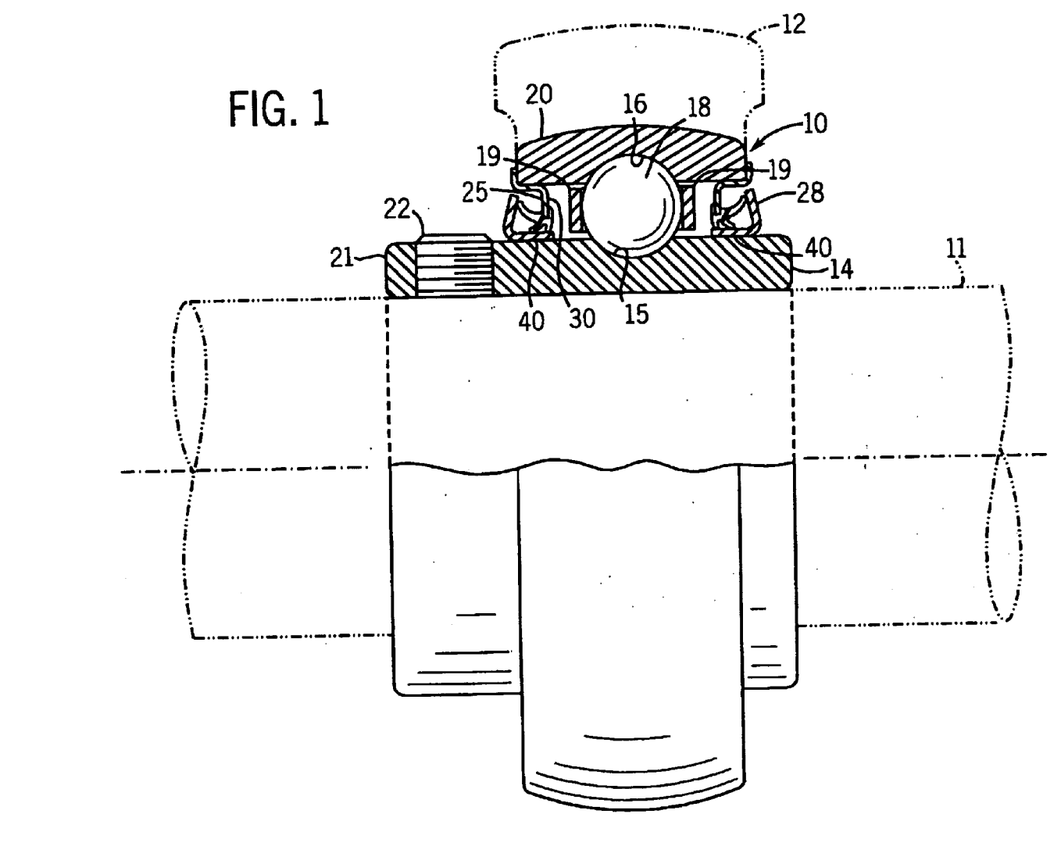
FIG. 1 illustrates an exemplary rolling element bearing.

FIG. 1 illustrates an exemplary bearing assembly 10 showing an embodiment of the present invention mounted on a shaft 11 and retained within a conventional housing or pillow block 12. The bearing assembly 10 includes an annular inner ring 14 having an inner raceway 15. Surrounding the annular inner ring 14 in a spaced relation thereto is an annular outer ring 20 having an outer raceway 16 disposed in opposed relationship to the inner raceway 15. The raceways 15, 16 receive a plurality of rolling elements 18, here shown as spherical balls, in nesting relationship. The rolling elements 18 in this case are disposed in rolling element pockets of a conventional cage 19. It will be appreciated that any number of different rolling elements may be used with the bearing assembly of the present invention, including needle rollers, spherical balls and rollers, tapered rollers, and offset rollers.

The bearing assembly 10 may be affixed to a shaft 11 using any suitable means of attachment. As shown in FIG. 1, the inner ring 14 has an axial extension 21 formed with one or more threaded apertures through which setscrews 22 may be directed. The setscrews 22 may be tightened down against the shaft 11 to secure the bearing assembly to the shaft 11. Other means of attachment may also be used. For example, the inner ring may be formed with a plurality of axial finger extensions which may be compressed into secure engagement with the shaft 11 by means of a bearing locking collar, such as one of the type shown in U.S. Pat. No. 5,863,137 incorporated herein by reference. It should be understood that the bearing assembly shown in FIG. 1 is exemplary, and that the rolling element bearing of the present invention may have any geometry and construction and is in no way limited to that shown in FIG. 1.

The new hydrocracked oil-based grease with a lithium complex thickener of the present invention provides a superior combination of properties that extend the life of the grease as well as the life of the bearing in which it is used. It runs cooler, has very good oxidation, good low temperature properties, and excellent wear and EP (extreme pressure) properties.

A series of tests were run to show the status and performance characteristics of the new hydrocracked oil-based grease with a lithium complex thickener. Included in these tests were a variety of grease lubricants covering the major oil plus thickener combinations. An outside testing house, Petro-lubricant Testing, Inc, performed all the testing. All the tests were standard ASTM tests and were in general those tests that are not reported as actual values in specifi cation sheets. Oil viscosity, etc was not tested because specification sheets provide accurate data on this property. Wear data is always presented as a minimum or maximum value on specification sheets, therefore, this property was extensively evaluated.

The base oil for the new grease is called a cracked hydrocarbon, a Group II oil, or a hydrotreated distillate. Group II oils are generally available from the larger petroleum companies, such as Chevron. In addition, the hydrocracked oil-based grease includes a lithium complex thickener of 15–18%. For purposes of this invention, the base oil used will be referred to as either a cracked hydrocarbon oil or a Group II oil. For a detailed discussion of the differences between a Group I oil and a Group II oil and hydrocracking of oil in general, reference is made to an article entitled "The Push Toward Lifetime Lubes" appearing in the May 17, 2001 issue of Machine Design that is hereby incorporated by reference. Instead of using a solvent to remove impurities, the base oil is treated with hydrogen in a high temperature, high pressure reactor, to provide the hydrocracking. The effect is to convert oxidizable aromatic compounds to more stable cycloparaffin compounds and reduce sulfur, nitrogen and oxygen impurities. The cycloparaffin compounds have higher viscosity indexes, low pour points, almost no color and very little varnish. They are also less costly to produce than synthetic oils since they can be made from a cheaper base stock in the same plants as other petroleum products.

The lithium complex thickener used is essentially a chemical sponge. Technically, it is a metallic soap with a complex micellar structure. Oil saturates the soap structure and is released to the mating metal parts as needed. The lithium complex thickener has excellent high temperature properties, and is easy to manufacture and store. In a preferred embodiment the lithium complex thickener comprises 15–18% of the lubricant.

In addition, a number of other lubricant additives may be used to increase the performance of the grease. For example, dispersants, detergents, antiwear and extreme pressure additives, oxidation inhibitors, and rust and corrosion inhibitors may be used in to increase the performance of the grease in certain situations. For a detailed discussion of the various additives that may be added to the grease, reference is made to the article 1992 "Lubricant Additives and Their Functions" by Syed Q. A. Rizvi, incorporated by reference herein. Preferably, the hydrocracked oil/lithium complex thickener of the present invention includes an EP additive(s) which may comprise 3–5 percent of the lubricant. EP additives are known in the art and described in the Rizvi article noted above. Also, the lubricant preferably includes a corrosion inhibitor. Most preferably, the lubricant includes a corrosion inhibitor such as lithium dionyl sulfonate in the amount of 3–5 percent of the lubricant.

The SMG grease tested below included a hydrocracked base oil, 15–18 percent lithium complex thickener, 3–5 percent dithiocarbamate and dithiophosphate as EP additives, and 3–5 percent dionyl sulfonate as a corrosion inhibitor. Finally, the lubricant preferably also contains an antiwear additive(s). Antiwear additives are known in the art and described in the Rizvi article noted above.

Set forth below, are the test greases and their major constituents.

| Grease | Thickener/Oil |
| --- | --- |
| Hycrocracked Oil-Based Grease of the present invention | Lithium complex - Hydrocracked Oil |

| Grease | Thickener/Oil |
| --- | --- |
| Mobilith AW2 | Lithium complex - Mineral oil |
| Mobilith SHC 220 | Lithium complex - Synthetic |
| Exxon Arapen | Calcium/Lithium - Mineral oil |
| Texaco Multifak | Lithium - Mineral Oil |
| Chevron SRI | Polyurea - Hydrocracked Oil |
| Shell Alvania #2 | Lithium 12 - Mineral Oil |
| Shell Darina EP 2 | Gel - Mineral Oil |

The outside ASTM tests performed were as follows:

| ASTM spec. | Test/Grease |
| --- | --- |
| D 942 | Oxidation stability-Loss psi—This test measures the decomposition of the oil due to reacting with oxygen at a given temperature. The volume of oxygen consumed is measured by the pressure loss in psi. |
| D 1264 | Water washout - %—Grease is applied to a plate and washed away. The less washed away the better. |
| D 5969 | Rust Prevention 5%—Standard testing uses pure water in contact with a Timken tapered roller bearing that is coated with the grease. A pass grade is given if no rusting occurs. Salt is added to the solution to increase the difficulty. Tested at 5% salt solution. |
| D 2509 | Timken Load carrying Test @ 50 pound load.—Three balls are fixed and one rotates under a fixed load. This is a pass/fail test. A grease passes if it does not seize before the full load is applied. The wear scar is measured. A smaller wear scar indicates a better grease. |
| D 2596 | 4 Ball EP Index—Three balls are fixed and one rotates under increasing load. The last load and the wear scar before the balls seize is recorded. The weld load is measured. An index is calculated based on the loads before welding. |
| D 2266 | 4 Ball Scar—mm This test measures the wear scar from another 4 ball test running at a constant load for an hour. This measures the lubricity and anti-wear properties of the grease. |
| D 1742 | Oil Separation %—This measures how much oil separates from the thickener. |
| D 4048 | Copper corrosion—This is another pass/fail test to see if the additives attack the brass retainer. |
| D 4693 | Low Temp torque test—–40C NM—The torque required to turn a bearing at –40C is measured. |
| D 5483 | High temperature, high pressure DSC test—This measures the onset of oxidation of the grease under high pressure oxygen at high temperature. It is used to estimate the upper temperature usability of the grease. This differs from the oxidation stability test in that the temperature can be varied and this is supposedly more accurate. |

Each of the above-named ASTM tests are incorporated by reference herein. As set forth below, the hydrocracked oil-based grease with a lithium complex thickener referred to as "SMG" performed favorably, leading in a number of tests. The test results and some specification data are listed below:

TABLE 1

Specifications and test results

| ASTM spec. | Grease Type Brand | Li Complex HC SMG | Li Complex Mineral Oil Mobilith AW2 | Polyurea Synthetic Chevron SRI | Ca/Li Mineral Oil Exxon Arapen | Lithium Mineral Oil Texaco Multifak | Lithium Mineral Oil Shell Alvania | Microgel Mineral Oil Shell Darina EP | Li Complex Synthetic Mobilith SHC220 |
|---|---|---|---|---|---|---|---|---|---|
| D 942 | Oxidation stability - Loss psi | 1.5 | 2.5 | 2 | 3.5 | 1.5 | 3.5 | 4.5 | 0 |
| D 1264 | Water washout —% | 2.36 | 3.36 | 0.47 | 0.16 | 1.57 | 1.49 | .54 | 1.39 |
| D 5969 | Rust Prevention 5% | Pass | Fail | Pass | Fail | Fail | Fail | Fail | Fail |
| D 2509 | EP No Seize Load - 50 lbs. | Pass | Fail | Fail | Fail | Pass | Fail | Fail | Pass |
| D 2596 | Ball EP Inde | 58.46 | 45.13 | 31.6 | 25.26 | 38.46 | 21.14 | 41.7 | 41.7 |
| D 2596 | Weld Load-k | 400 | 250 | 126 | 160 | 250 | 160 | 250 | 250 |
| D 2266 | 4 Ball Scar-mm | 0.51 | 0.53 | 0.53 | 0.48 | 0.46 | .66 | .7 | .64 |
| D 1742 | Oil Separation % | 3.13 | 2.82 | 0.42 | 1.51 | 4.38 | 5.93 | 0.0 | 2.19 |
| D 4048 | Copper corrosion | 4a | | | | | | | |
| D 4693 | Low Temp torque test- -40C NM | 7 | 16 | 11 | 15 | 11 | 14.2 | 17.13 | 3.5 |
| D 5483 | High temperature, high pressure DSC test | 180C-62 min. | 210C-21 min. | 180C-none 210C - 37 min. | 180C-14 min. | 180C-63 min. | 180C-56 min | 210C-35 min. | 210C-67 min |
| * | Viscosity-cSt @40C | 115 | 145 | 100 | 163 | 168 | 99 | 122 | 220 |
| * | Viscosity-cSt @100C | 12.2 | 13 | 11 | | 15.6 | 11.2 | 12.2 | 23.8 |
| * | Worked Penetration - 60x | 280–300 | 280 | 280 | 290–320 | 286 | 287 | 285 | 280 |

* Specification sheet or previous test data

Figure 2A:
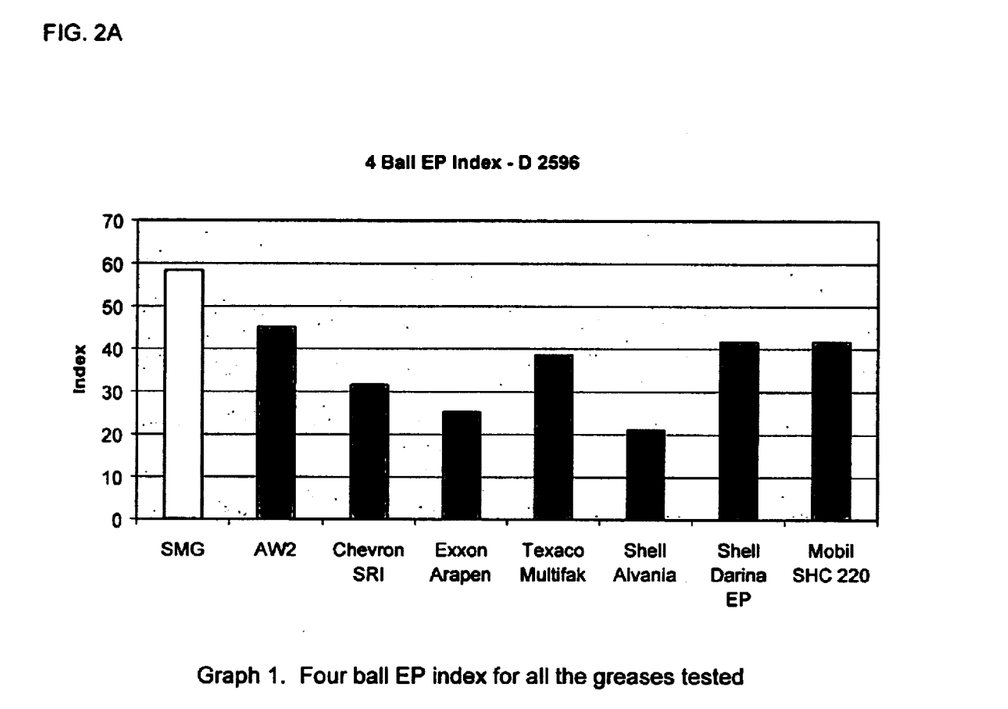
FIG. 2 shows certain grease properties in Graph 1 and Ball Load Weld results in Graph 2.
Figure 2B:
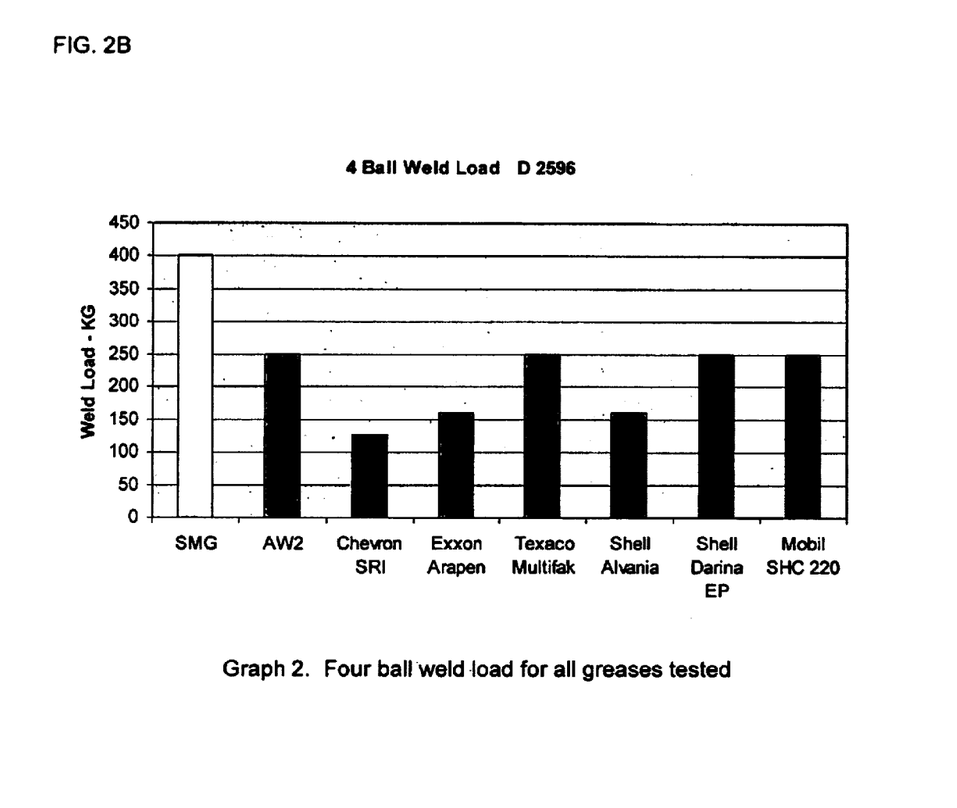

The EP properties of the Gold Line Grease are especially good as shown in graph of the Load Wear Index shown in FIG. 2.

Figure 3:
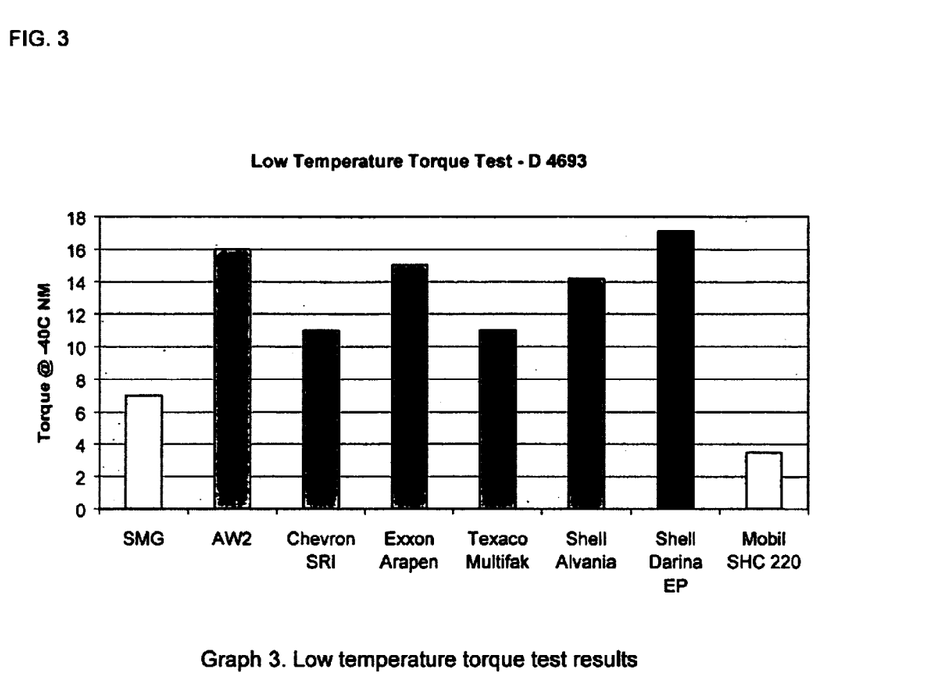
FIG. 3 shows Low Temperature Torque.

The low temperature properties are also good with SMG, which had the second lowest torque to rotate a bearing at −40° C. SEE FIG. 3.

Figure 4:
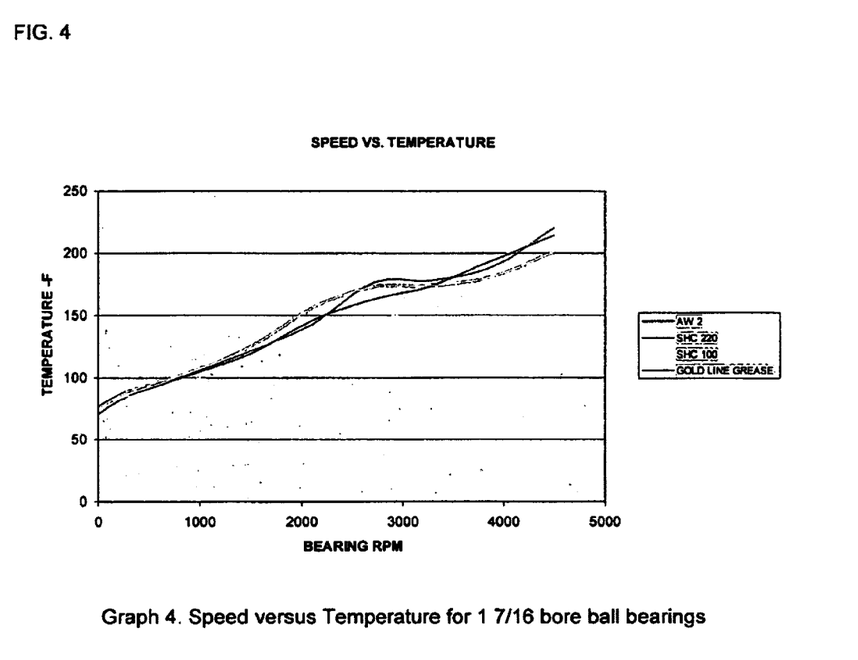
FIG. 4 shows Speed versus Temperature.

The low temperature torque data also compares well with the results of the speed versus temperature tests. The new SMG grease (referred to as Gold Line Grease in the chart below) has less drag than mineral oil based grease, and even less drag or better lubricity than the SHC 100 grease, a standard high speed grease. This is reflected in the lower heat generated during the high speed operations. At speeds over 100 rpm the new SMG ran cooler than the other greases tested. This provides longer lubricant life due to a lower operating temperature. In addition, real-life testing and in-house hot box testing reveals that the SMG grease has a bearing service rating of 350 degrees Celsius which is 100 degrees higher than the mineral oil/lithium complex thickener grease previously used. Thus, the effective temperature range is significantly increased by the hydrocracked oil/lithium complex thickener grease of the present invention. SEE FIG. 4.

Figure 5:
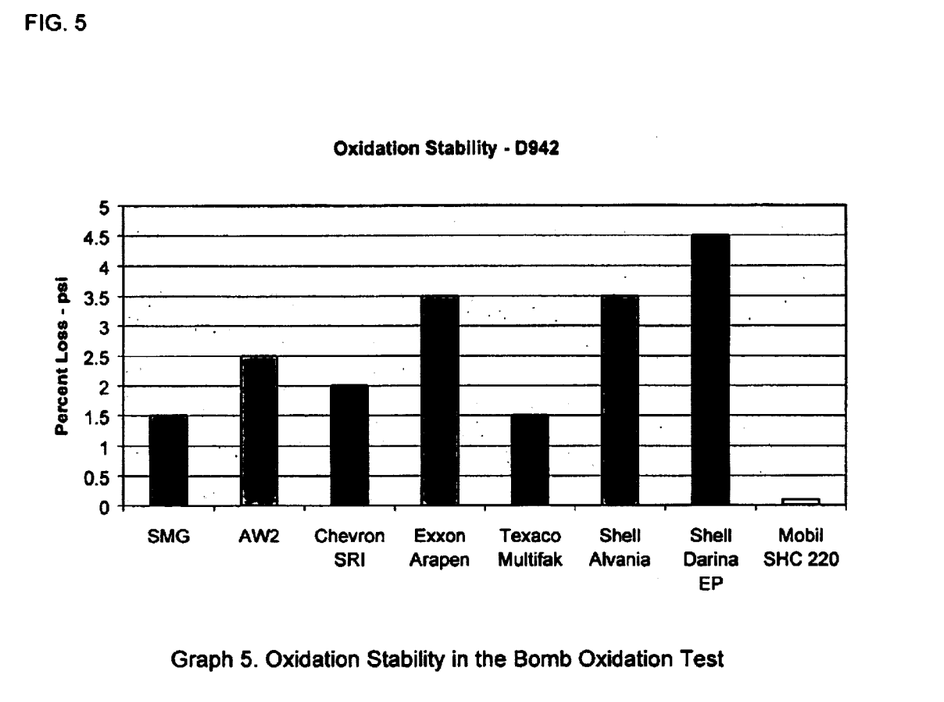
FIG. 5 shows Oxidation Stability.

Oxidation as measured by the oxygen loss revealed much about the greases. They broke into three groups as defined by the base oil type. Mobilith SHC 220 a synthetic oil had no (zero %) loss in the bomb oxidation test. A small value was entered to show the location of the SHC grease but the test result was zero % loss. SEE FIG. 5.

Figure 6:
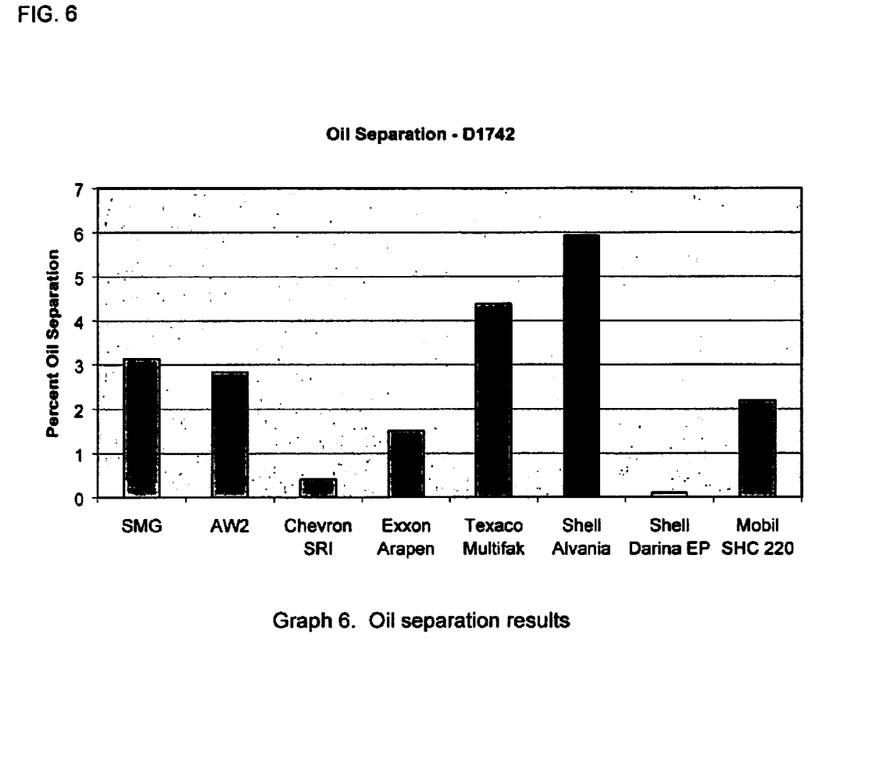
FIG. 6 shows Oil Separation.

The effect of thickener type shows dramatically in the oil loss test. The gel thickener in the Shell Darina had no oil loss. The polyurea thickener also provided a very low oil loss. SEE FIG. 6.

Figure 7:
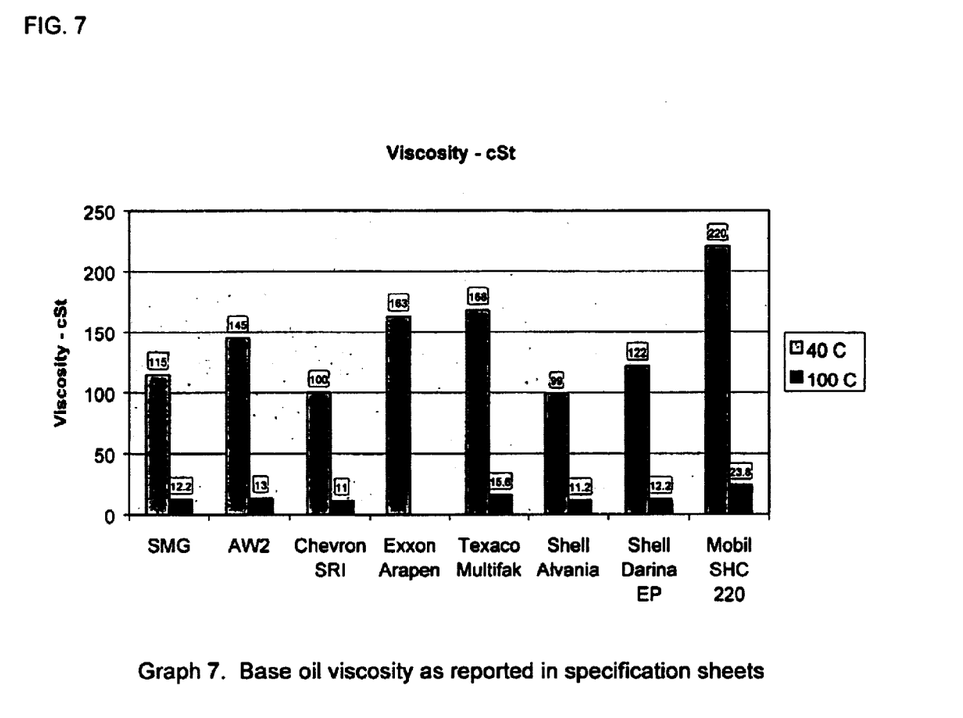
FIG. 7 shows Base Oil Viscosity.

All the greases were NLGI 2 grease (National Lubricating Grease Institute). All had viscosities between 100 and 220 CST at 40° C. The SMG grease was relatively low at 115 cSt, but others were also this low. At 100° C., the viscosities were not all that different. The SHC 220 was still relatively higher but in absolute terms only 7 to 12 cSt higher. SEE FIG. 7.

The Timken Load Carrying Test, the Load Wear Index with its constituents, and the Four Ball Wear Test measured the wear properties of the grease. The SMG performed very well in all these tests. In addition, the SMG grease showed superior high temperature properties. Oil viscosity obviously varied with temperature. The greases tested have a range at 40° C. from 99 to 220 cSt while at 100° C. they varied from 11 to 23.8 cSt. In the speed vs. temperature testing, AW2 ran out of the bearings at the high speeds while the SMG did not. At 100° C., they both have the same viscosity. Furthermore, the SMG showed excellent low temperature torque indicating that it is serviceable to −50° F.

The pressure—viscosity coefficient for the hydrocracked oil in the grease of the present invention became available at the conclusion of this testing. Calculations for tapered roller bearings compared the Mobilith AW2, Arapen and Multifak to the new grease. The calculations set forth below show that film thicknesses are essentially equal for all four oils. The lower viscosity of the new grease is offset by a higher pressure—viscosity coefficient. Mineral oil was used for the Multifak.

| Film Thickness Results at 125° F. at 1250 pounds load, 400 rpm - microns | | |
| --- | --- | --- |
| Grease | Inner Race | Outer race |
| SMG | 2.0 | 1.64 |
| Arapen/Multifak | 2.04 | 1.68 |
| Mobilith AW2 | 1.86 | 1.53 |

Overall this testing has shown the advantages of the new SMG grease. It combines excellent corrosion resistance, low and high temperature proficiency, high load capacity and high speed capabilities in a single grease.

The grease of the present invention may also be used in applications other than in connection with the lubrication of a rolling element bearing. Nor is the invention limited to the embodiment shown in FIG. 1. To the contrary, the present invention may be used in connection with any type of rolling element bearing.

What is claimed is:

1. A bearing assembly comprising:
    a bearing inner ring having an inner raceway on an outer surface thereof;
    a bearing outer ring having an outer raceway on an inner surface thereof, said outer ring positioned such that the inner raceway is in an opposed and spaced apart relation from the outer raceway;
    a plurality of rolling elements disposed between the inner raceway and the outer raceway;
    a lubricant disposed about the rolling elements between the inner raceway and the outer raceway;
    said lubricant comprising a hydrocracked base oil and a lithium complex thickener.

2. The bearing assembly of claim 1, wherein the low temperature torque at −40° C. is 7 NM or less.

3. The bearing assembly of claim 1, wherein the lithium complex thickener comprises 15–18% of the lubricant.

4. The bearing assembly of claim 1, wherein the lubricant further includes EP additives comprising 3–5% of the lubricant.

5. The bearing assembly of claim 4, wherein the EP additives comprise Dithiocarbamate and dithiophosphate.

6. The bearing assembly of claim 1, wherein the lubricant further includes a corrosion inhibitor comprising 3–5% of the lubricant.

7. The bearing assembly of claim 6, wherein the corrosion inhibitor comprises lithium dionyl sulfonate.

8. The bearing assembly of claim 1, wherein the grease has upt o a 400 kg weld load capacity in the four ball ASTM D2596 standard.

9. The bearing assembly of claim 1, wherein the bearing has a EP four ball load wear index greater than 50 according to the ASTM D2596 standard.

10. A rolling element bearing grease comprising a hydrocracked base oil and a lithium complex thickener, wherein the lithium complex thickener comprises 15–18% of the grease.

11. A rolling element bearing grease comprising a hydrocracked base oil and a lithium complex thickener, further including EP additives comprising 3–5% of the grease.

12. The grease of claim 11, further including a corrosion inhibitor comprising 3–5% of the grease.

13. The grease of claim 12, wherein the corrosion inhibitor comprises lithium dionyl sulfonate.

14. The grease of claim 11, wherein the corrosion inhibitor comprises lithium dionyl sulfonate.

15. The grease of claim 14, wherein the EP additives comprise dithiocarbamate and dithiophosphate.

16. The grease of claim 11, wherein the EP additives comprise dithiocarbamate and dithiophosphate.

17. A rolling element bearing grease comprising a hydrocracked base oil and a lithium complex thickener, further including a corrosion inhibitor comprising 3–5% of the grease.

18. The grease of claim 17, wherein the EP additives comprise dithiocarbamate and dithiophosphate.

19. A rolling element bearing grease comprising a hydrocracked base oil and a lithium complex thickene, wherein the lithium complex thickener comprises 15–18% of the grease, said grease further including EP additives comprising 3–5% of the grease and a corrosion inhibitor comprising 3–5% of the grease.

20. The grease of claim 17, wherein the corrosion inhibitor comprises lithium dionyl sulfonate.

21. The grease of claim 19, wherein the EP additives comprise dithiocarbamate and dithiophosphate.

22. The bearing assembly of claim 19, wherein the bearing has a EP four ball load wear index greater than 50 according to the ASTM D2596standard.

23. The bearing assembly of claim 19, wherein the grease has up to a 400 kg weld load capacity in the four ball ASTM D2596 standard.

* * * * *